United States Patent [19]

Crandall

[11] 4,088,983
[45] May 9, 1978

[54] ELECTRONIC POLLING AND CALLING COMMUNICATION SYSTEM

[75] Inventor: Kenneth C. Crandall, Roseville, Minn.

[73] Assignee: Elan Industries, Inc., St. Paul, Minn.

[21] Appl. No.: 626,233

[22] Filed: Oct. 28, 1975

[51] Int. Cl.² .............................................. H04Q 9/00
[52] U.S. Cl. ................................ 340/147 R; 340/408; 340/147 SY; 340/167 A
[58] Field of Search ................ 340/408, 167 A, 167 R, 340/206, 168 R, 164 R, 147 R, 213.1, 147 SY

[56] References Cited

U.S. PATENT DOCUMENTS

| | | | |
|---|---|---|---|
| 2,275,147 | 3/1942 | Hershey | 340/167 A |
| 3,634,824 | 1/1972 | Zinn | 340/167 A |
| 3,678,512 | 7/1972 | Fergus | 340/408 |
| 3,946,362 | 3/1976 | Sumida | 340/147 SY |

*Primary Examiner*—Harold I. Pitts
*Attorney, Agent, or Firm*—Jacobson and Johnson

[57] ABSTRACT

In an electronic communication system, having a central transmitting station and N remote receiving stations, the central station sends out a signal train consisting of a wide reset or synchronizing pulse (R) and a series of N narrower time-sequenced or time-slotted clock pulses (C). An intermediate width station selector pulse (S) in the signal train designates a call to a particular remote station. The receiving stations are equipped to recognize, acknowledge and respond to the signal train in the correct fashion if in the calling mode or in the polling mode of operation.

7 Claims, 10 Drawing Figures

# ELECTRONIC POLLING AND CALLING COMMUNICATION SYSTEM

BACKGROUND OF THE INVENTION

Field of the Invention

This invention is for use as a relatively simple communication system for establishing a communication link between a central station and a number of remote stations. For example, it can be used in security alarm systems where a central station can call upon a number of unattended remote locations to take some action, if necessary, or the security status of each remote location can be polled or inquired into. For example, a number of unattended stations may have fire detection devices and the status of the fire detecting devices can be continuously monitored. If the device detects a fire, this is communicated to the central station which can then call that station to turn on an alarm or a sprinkling system or the like.

The system is not intended to carry on a sophisticated transfer of information and intelligence between the central station and the remote receiver stations. It is basically designed and constructed to operate so that the remote station will recognize when it is being called or polled and will send back a signal indication indicating its status, if it is being polled, or if being called, will recognize that fact and will respond by taking some prearranged action. As another example, a farm or ranch might have a sprinkling system and the operator might want to turn on sprinklers selectively at different locations. Also, the system might be equipped with devices which sense the moisture level at each remote station and when the station is polled and the moisture has reached a prescribed level, it returns a signal to indicate the moisture level and an operator or automatic controller can then turn off the sprinkler at that location.

SUMMARY OF THE INVENTION

A central station transmits a pulse train consisting of a series of N uniform-amplitude clock pulses (C) each in a separate allocated sequential time slot in the signal train, and a reset or synchronizing (synch) pulse (R). At each remote station the signal train is received and the width or time duration of each of the received pulses in the signal train is determined. Each of the C pulses is used as a counting pulse to tell the receiving station which of the time slots the signal train is at. An intermediate-width station-selector pulse (S) in the train designates that the remote station corresponding to that particular time slot pulse is being called. The C pulses can be either narrow or intermediate width. The single long pulse in the signal train is the R pulse to synchronize the count of the C pulses at each remote station. Each of the receiving stations has a counter or sequencer which has N stages or N signal states. The count or signal state of the sequencers is advanced by one by each received C pulse and each sequencer is reset to an initial starting signal state by an R pulse. In a polling mode, the remote station produces a signal indication of the status of the station in response to a signal inquiry from the central station at the time slot in the signal train corresponding to its designated station number. In a calling mode, the remote station recognizes an S pulse at its designated time slot in the signal train and responds by initiating some pre-arranged action of a device located at the remote station. As a feature of the invention, to avoid the possibility of a random signal, such as noise, erroneously causing some action at the remote station, the remote station includes means for accumulating a prescribed number of consecutive S pulses before any action is taken.

The system uses the same pulses which carry the coded information to the remote station for advancing the sequencer or counter at each remote station and the signal train contains a synchronizing pulse to ensure that the sequencer at each remote station is set to the same initial starting position. In this manner, correct synchronization between the central station and all of the remote stations is assured.

DESCRIPTION OF THE PREFERRED EMBODIMENT

Figure 1:
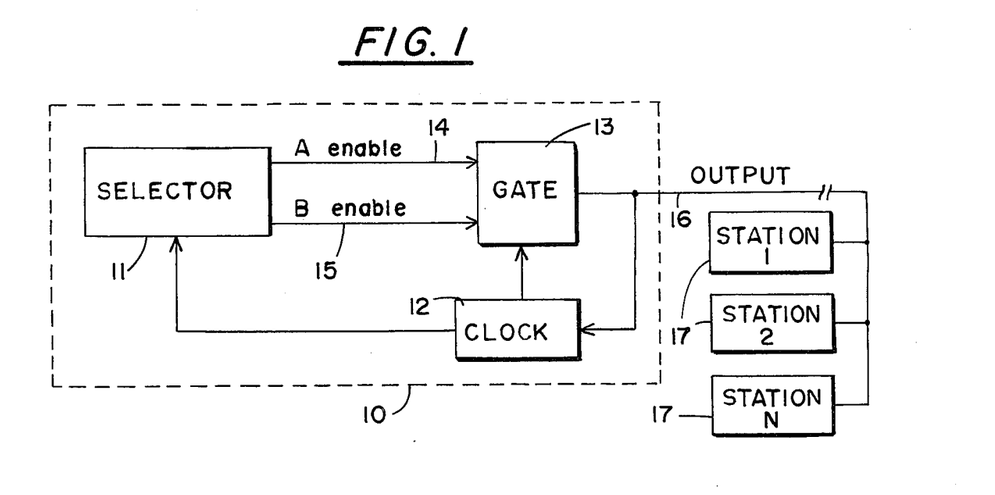
FIG. 1 is a block diagram of an overall system in which the instant invention is used.

A central station, enclosed by dashed line 10, includes a remote station selector 11, a basic timing clock 12 and a gate means 13. The clock 12 produces a series of sequential pulses which are fed to the selector 11 which, in turn, produces output signal conditions on A enable line 14 and B enable line 15 which are gated through gate means 13 to output line 16 by clock 12. The output signal on line 16 is also fed back to clock 12 to ensure the correct timing sequence for the transmitted signal train. The output signal train on signal line 16 consists of serialized pulses in time sequence and the signal train is transmitted concurrently to all of the remote stations 17. Each of the remote stations 17 contains means for recognizing that it is being called during the calling mode of operation, and each also contains means for responding when polled during the polling mode.

Figure 2:
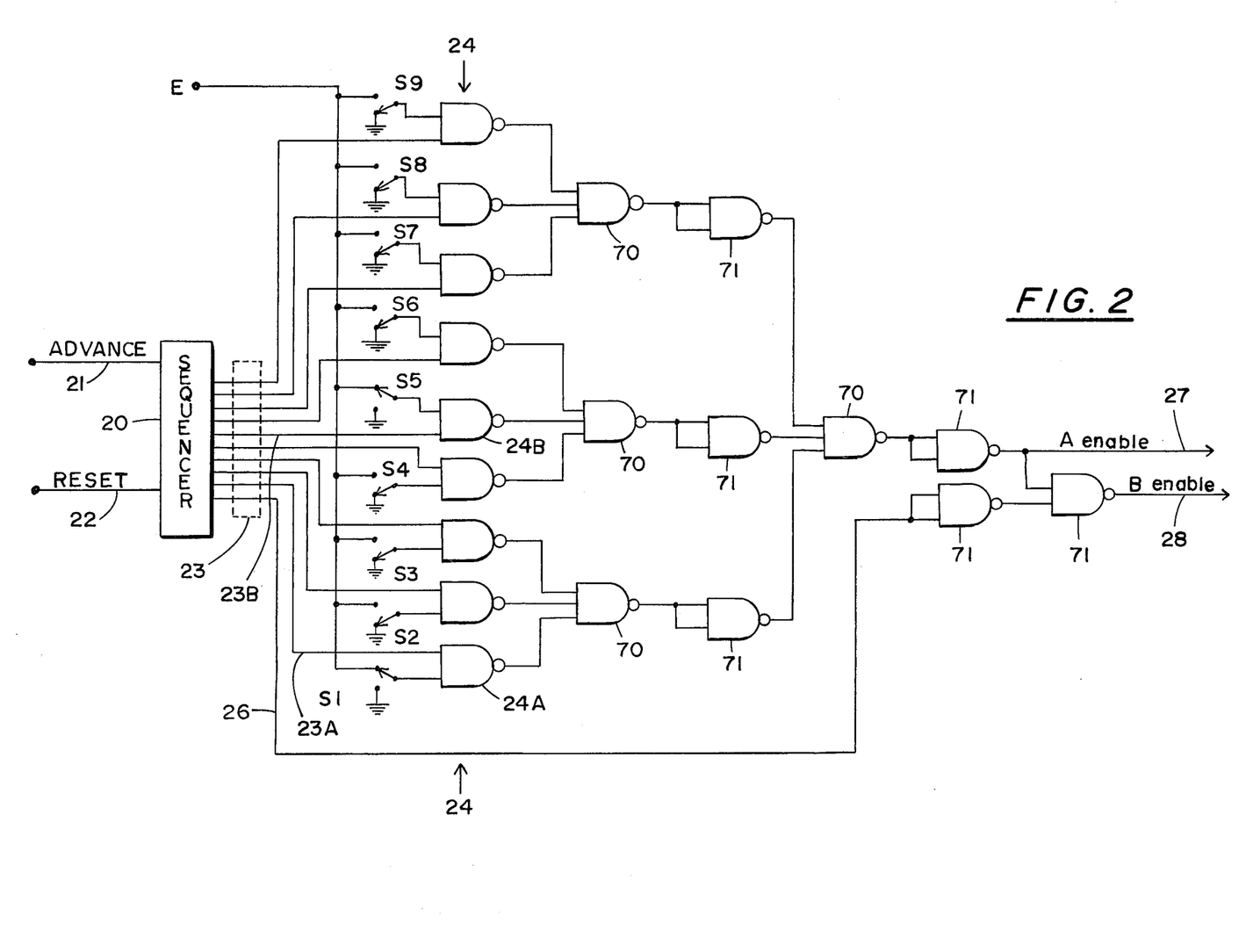
FIG. 2 illustrates a typical circuit which can be used for coding the signal train at a central station in a system which uses a preferred embodiment of this invention.
Figure 3:
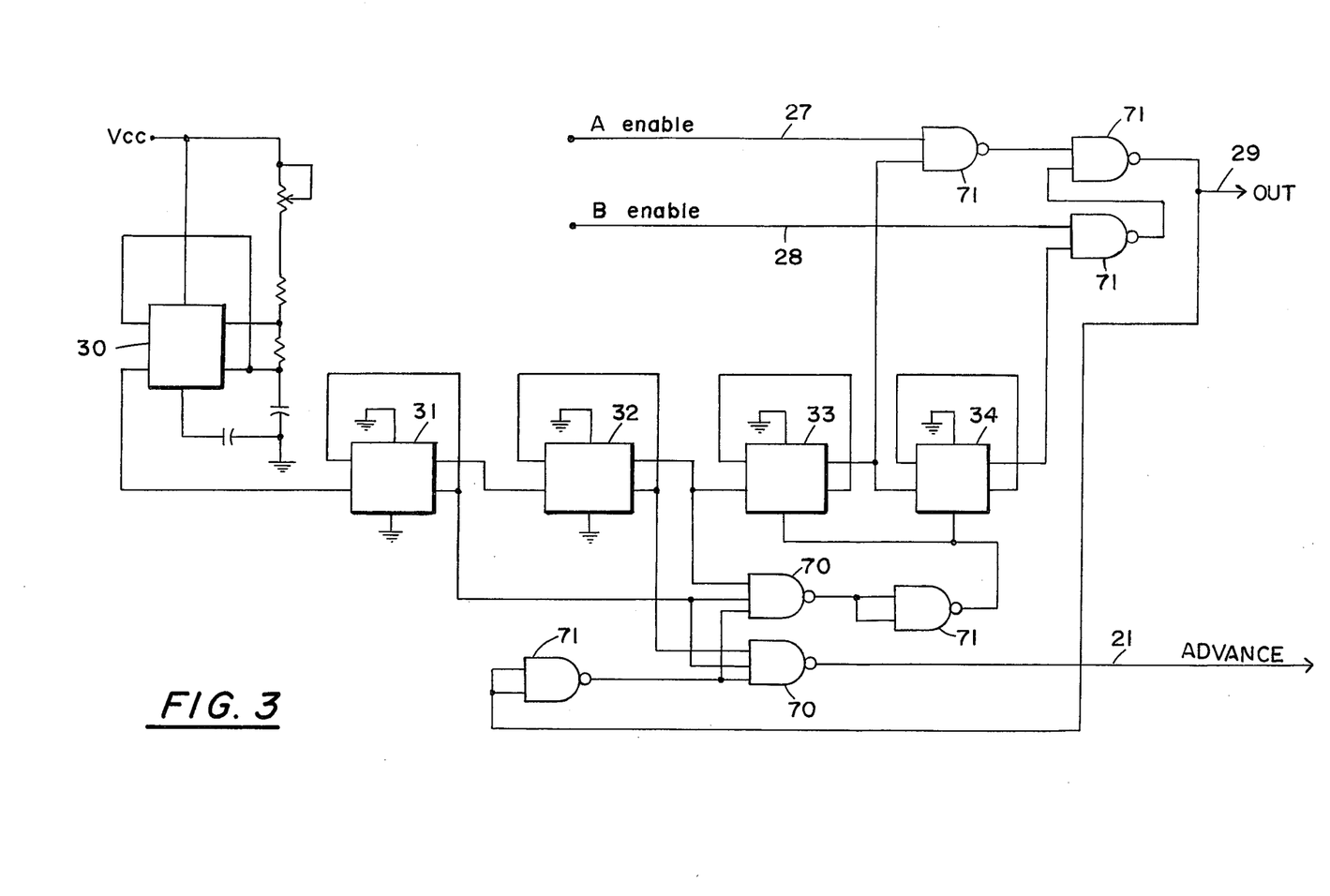
FIG. 3 illustrates a typical clock signal output train with suitable time sequence at the central station.

FIGS. 2 and 3 show, in some detail, the manner in which the desired signal train is produced for transmission from the central station. It should be understood that the circuit to be described is only intended to be illustrative of a manner in which the desired signal train can be produced and not limitation thereto is intended. The desired signal train can be produced in a variety of different manners and the design of the circuitry for producing the signal train is a matter of choice. The illustrative circuitry of FIGS. 2 and 3, as well as the illustrative circuit diagrams for the remote stations which are described later, contain logic gates which are here defined as logical "Nand's" but it should be understood that the type of logical gate that is used is also purely a matter of choice and other types of gates, such as "And" or "Or" gates can be used with suitable changes in wiring and logical arrangements but with equal results. In order to simplify the description, no attempt will be made to trace the signal level of each signal line into or out of each Nand gate but only the significant resulting output signals will be described. The Nand gates operate in a conventional manner so that when all of their inputs are "up," the output is "down" and if any input is "down," the output is "up."

The central station contains a sequencer or counter 20 which operates in a conventional fashion to count up the number of advance pulses which appear at its advance signal input line 21 up to the limit of its count capacity and then clears out and repeats the counting. Also, it can be set to a starting state by a pulse appearing at reset input 22. With N number of remote stations, sequencer 20 must have a minimum of N + 1 stages or signal states. Each of the N stages of the sequencer has a corresponding signal output line, collectively identified by reference number 23. As sequencer 20 is advanced through its various signal levels by the input pulses appearing at its advance input 21, a respectively different output signal line 23 is active. After the signal state of the sequencer has been advanced through all N stages and returns to its starting state or condition, it repeats through its signal states as successive advance pulses appear at input 21.

The output signal lines 23 from the respective stages of the sequencer 20 are logically combined at the input of a group of Nand's, collectively designated by reference numeral 24, with inputs from the movable arms of a series of manually operable toggle switches S1 -S9. For illustrative puposes, the arms of switches S1 and S5 are shown set to a signal level, arbitrarily designated E, and the arms of the remaining switches are set to signal ground. Each time that the signal state of sequencer 20 is such that stage 1 or 5 is in the "up" condition, the corresponding stage output lines, 23A and 23B, will be in the active condition so that the respectively corresponding logic gates 24A and 24B will have both inputs in the "up" condition. At the end of the count by sequencer 20 (more appropriately considered to be the start of the count), an active signal condition appears on output signal line 26. The outputs from Nands 24 are combined through other Nands to produce certain signal conditions on A enable line 27 and B enable line 28. The signal states appearing at the various Nand gates and the manner in which they are combined, is not described here in detail since, as stated earlier, this is purely a matter of choice and is not considered a part of the instant invention and can be easily determined by one of ordinary skill in the art. It is suffice to say that the signal levels are combined in such a manner so that the signals appearing on lines 27 and 28, later described in detail, are such as to produce the necessary output signal pulse train.

For the purpose of description, and for that purpose only, as an example, let it be assumed that the system involves a single central station and nine remote stations. N is then equal to nine and sequencer 20 then must have 10 separate stages or 10 separate signal conditions which can be logically combined in a fashion to produce the output signal train.

Figure 7:
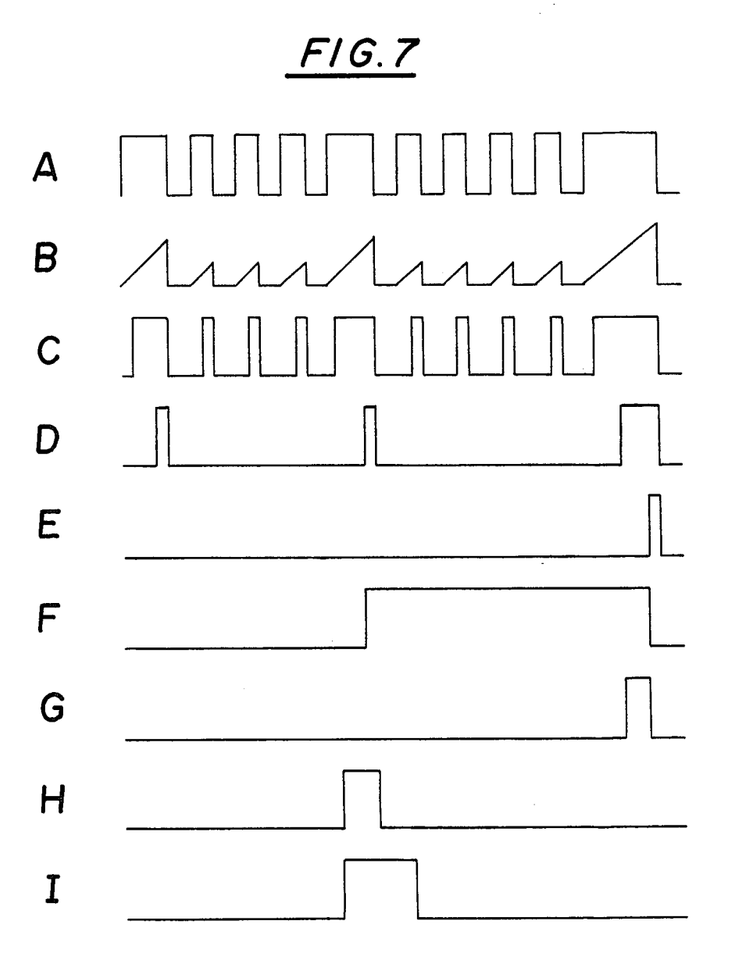
FIG. 7 illustrates typical idealized waveforms which appear at various locations in the system using the circuits of FIGS. 4 and 6.

FIG. 3 contains an illustrative circuit which can be used to produce signal inputs to advance input 21 of sequencer 20. The output from a tuned basic oscillator 30 is fed through a series of frequency divider stages 31, 32, 33, and 34, in a conventional fashion to produce a desired frequency signal output. Here again, the manner of producing the pulses is not considered to be a part of the invention and is a matter of choice, and the operation of the illustrated system is easily recognized and understood by one of ordinary skill in the art so no detailed explanation is considered necessary. Suffice is to point out that a suitable signal is produced to appear on signal line 21 to advance sequencer 20 as desired. The signal conditions on A enable signal line 27 and B enable signal line 28 are combined in logical Nand circuits to produce a signal train at output signal line 29. For illustrative purposes, the clock, consisting of the oscillator 30 and the frequency divider stages 31–34, is designed so that if all of the switches S1–S9 are set to the signal ground positions, a signal train consisting of a series of nine equal width or equal duration square wave pulses, each in a respective time slot, followed by a single wide pulse will appear repetitively on output signal line 29. Also, for illustrative purposes and again merely a matter of choice, the short duration pulse widths may be in the order of about 2 milliseconds and the pulse duration of the wide pulse may be in the order of about 6 milliseconds. Each of the nine C pulses in the signal train appearing on output line 29 is in a different time slot in the signal train and each time slot is associated with a corresponding one of the nine remote stations. The long R pulse constitutes a synchronizing (synch) pulse. If any of the switches S1–S9 is set to other than its signal ground position, there will be produced an intermediate width S pulse in the appropriate time slot in the signal train on output signal line 29. For example, as FIG. 2 illustrates, consider switches S1 and S5 in their ungrounded positions. The output signal train will then contain an S pulse at time slots one and five. The idealized waveform of the signal train at output line 29 is illustrated at FIG. 7A. All of the C pulses in the signal train of FIG. 7A are of equal magnitude but the pulses in time slots one and five are S pulses and the last pulse is an R pulse. Typically, for illustrative purposes only, the intermediate pulse may be in the order of about 4 milliseconds wide.

By means not shown, the output signal train on line 29 is then transmitted out to the various remote stations. This might be done by wireless transmission, using a modulated radio frequency carrier, or might be over a telegraph line or perhaps over an AC power line. The manner of transmission is also merely a matter of choice and does not constitute a part of the instant invention. Therefore, no description of the manner of transmission is considered necessary and one of ordinary skill in the art can readily design a suitable system for transmitting this desired signal train from the central station so that it can be picked up at the various remote stations.

Figure 4:
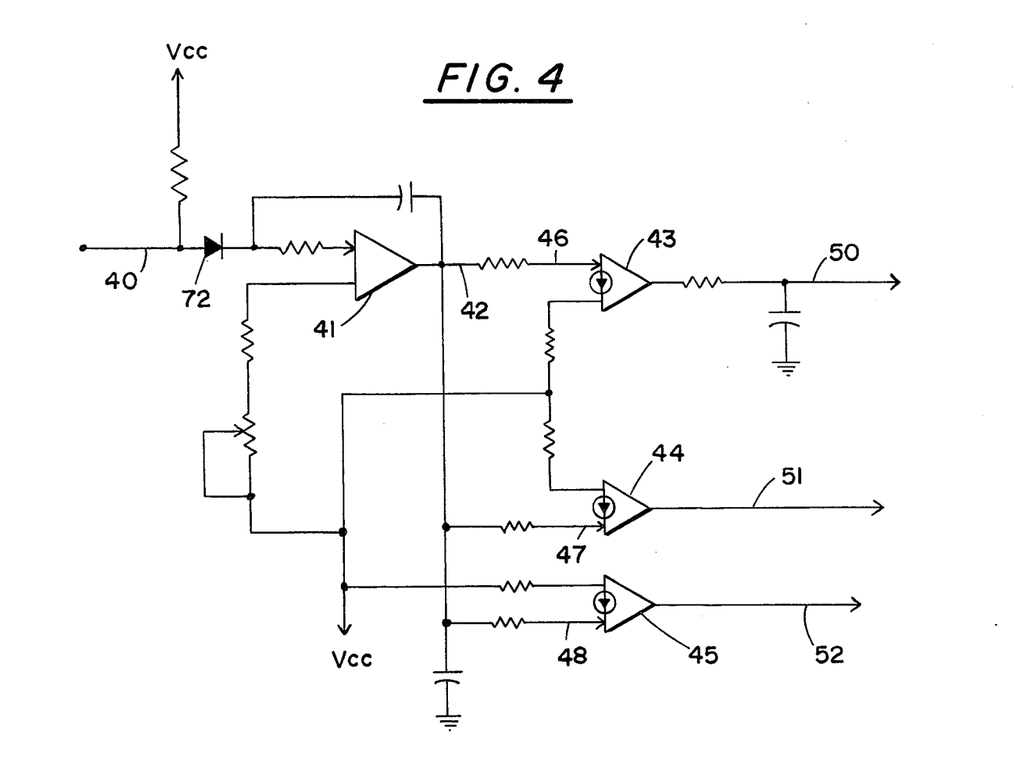
FIG. 4 illustrates a circuit at the input of a remote station used for detecting the signal train pulse widths.

Turning next to FIG. 4, there is shown the input stage of each of the remote stations. Each has an input signal line 40 for receiving a signal train such as the type illustrated in FIG. 7A. Here again, it should be understood that the signal train would be removed or demodulated from its carrier but the manner of doing so is not considered part of the invention and is readily designed by one of ordinary skill in the art of signal transmission and reception. It should suffice to point out that the demodulation must be such as to reproduce the signal train in substantially the same form as it appeared on the output line 29 of the central station. The signal train on input signal line 40 is coupled to the input of a ramp generator or integrator circuit 41 via suitable electrical components, including a diode and a set of resistors. The detailed circuitry of the integrator 41 is of no consequence. It should suffice to point out that the integrator 41 is designed to produce a sawtooth waveform signal train, such as illustrated in FIG. 7B, in response to the received signal train of 7A to give a signal representation of the width of each of the respective pulses in the received signal train. A number of different circuits can be readily designed by one of ordinary skill in the art to perform this function. As shown in FIG. 7B, the height or magnitude of each sawtooth wave is dependent upon the width of the corresponding pulse in the input signal train 7A. The S pulses at time slots one and five produce an intermediate length ramp; the remaining seven narrow pulses each produce a short ramp; and the R pulse produces the largest ramp. The output of integrator 41 appearing on signal line 42 is fed separately into each of three different comparator circuits 43, 44 and 45 via respective signal lines 46, 47 and 48. The design of the circuit for the comparators 43, 44 and 45 is also not considered unique or a part of the instant invention and, therefore, is not described in any detail. It should suffice to point out that these circuits are designed to respond to each of the signals in the sawtooth waveform signal train of FIG. 7B. Some further explanation of the output of comparator 43 is necessary here. It has been found that the signal waveform has to be sharpened and to do so, it has to go through another stage of inversion. To return it to the correct polarity it is inverted through logical Nand 55. Comparator 43 is designed to produce a high output from Nand 55 when the input to comparator 43 equals or exceeds a relatively low magnitude; comparator 44 is designed to produce a high output when its input equals or exceeds an intermediate magnitude; and comparator 45 is designed to produce a high output only when it receives an input of relatively high magnitude. To best illustrate this, assume that the maximum magnitude of the input signal to the comparators 43, 44 and 45 is a voltage level arbitrarily designated V and, further, that comparator 43 is designed and set so the output from Nand 55 will be high when the input to comparator 43 is 1/6 V or greater; comparator 44 is designed and adjusted so that its output will go up only when its input signal reaches a magnitude of ½ V or greater; and comparator 45 is designed and set so that its output will be up only when its input signal is at a level of 5/6 V or greater. In that case, it can be observed that with a ramp or sawtooth waveform signal train input such as illustrated in FIG. 7B, comparator 43 will produce signal outputs such as shown in FIG. 7C at the output of Nand 55; comparator 44 will produce signal outputs such as in FIG. 7D on its output line 51; and comparator 45 will produce a signal train such as illustrated at FIG. 7E on its output line 52. By comparing the signals at the output of Nand 55 and on signal lines 51 and 52, (FIGS. 7C, 7D and 7E respectively) to the input signal train at input line 40 (FIG. 7A), it can be observed that the output of Nand 55 has a pulse for each received C pulse; signal line 51 carries a pulse for each received S pulse; and signal line 52 carries a pulse only for each received R pulse.

Figure 8:
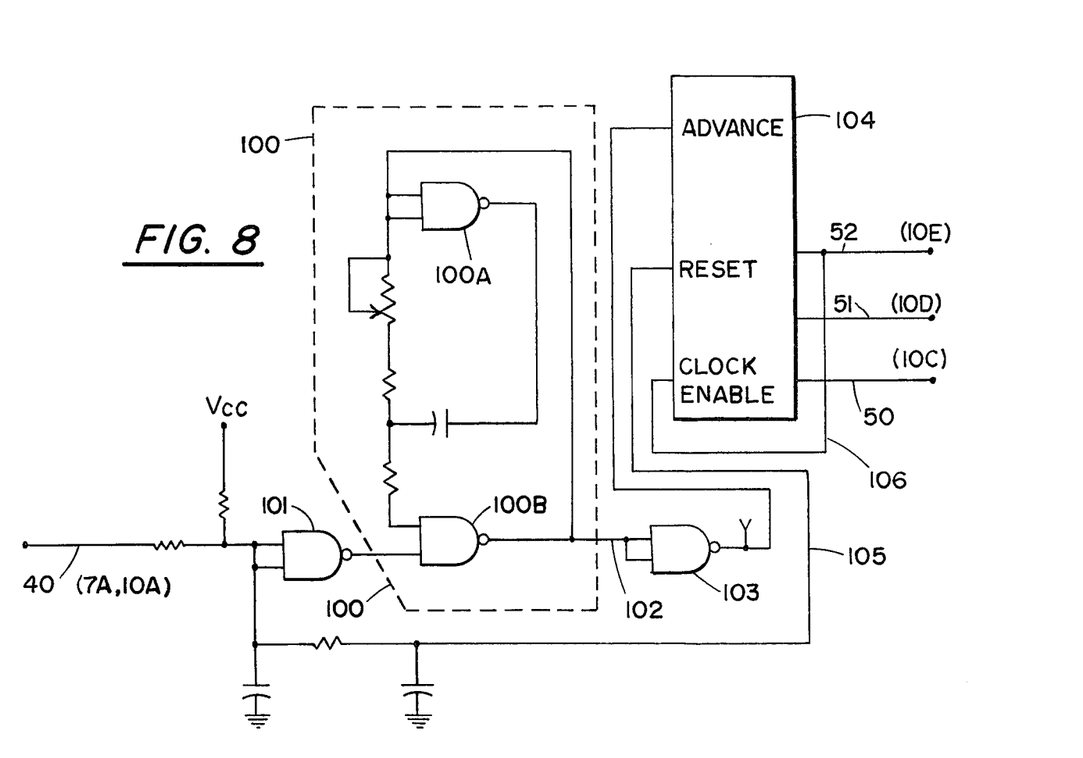
FIG. 8 illustrates an alternative circuit for use at the input of a remote station for detecting the signal train pulse widths.
Figure 10:
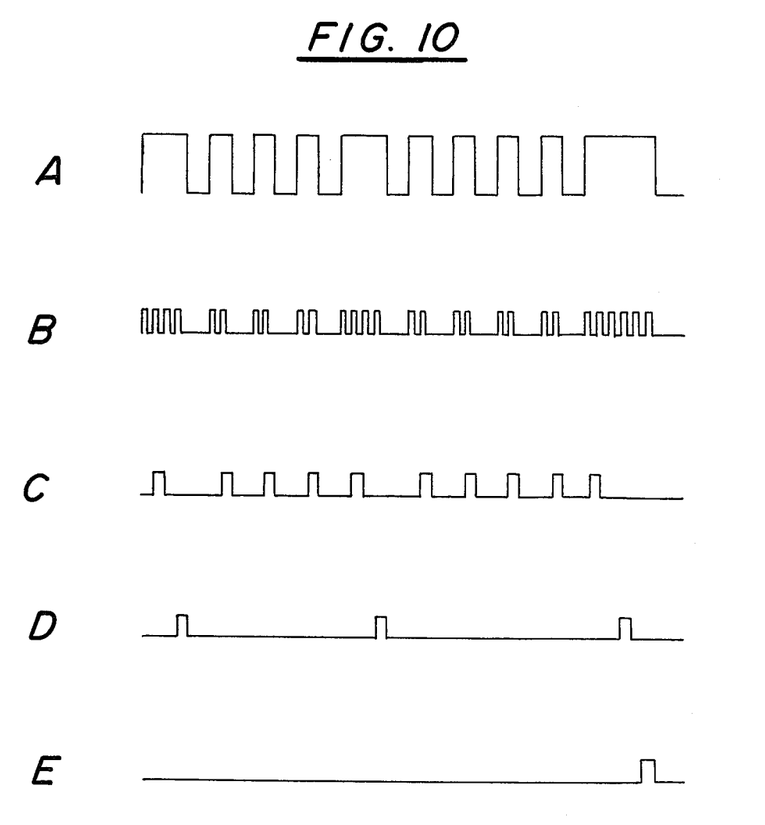
FIG. 10 illustrates typical idealized waveforms appearing at various locations in the system using the circuits of FIGS. 8 and 9.

A digital circuit that can be used at the input of each of the remote stations as an alternative to the analog circuit of FIG. 4, is illustrated in FIG. 8. Essentially, the circuit comprises an astable multivibrator or clock 100 consisting of a pair of cross-coupled Nands, 100A and 100B. The clock 100 contains an adjustment to set the output signal to a predetermined frequency. The input signal train on line 40 (see waveform FIG. 10A which is the same as the waveform of FIG. 7A) passes through a buffering Nand 101 and when, at a high or up signal level, triggers the clock oscillations and turns off the clock oscillations at a low input level. The output from the clock 100 on signal line 102 is fed through another Nand 103 into the advance input of sequencer 104 which operates in the same fashion as the sequencers described earlier. Each pulse output from clock 100 advances sequencer 104 so that a next successive stage becomes set. As would be expected, and as illustrated in FIG. 10B, the signal output from clock 100 appearing on output line 102 and being fed to the advance input of sequencer 104 has the least number of pulses (two are shown for illustrative purposes only) for each of the narrow C pulses of the input signal train (FIG. 10A); the greatest number of pulses (for example, six) for each of the widest R pulses of the input signal train; and an intermediate number of pulses (for example, four) for each of the intermediate width S pulses of the input signal train. The input signal train line on 40 is also fed to the reset input of sequencer 104 via line 105. This causes the sequencer 104 to be reset or set to the same starting condition each time the input signal reaches a down or low level. Sequencer 104 then counts up the number of pulses that occur during each period of time that the input signal train reaches and remains at a high level. Output signal line 106 from sequencer 104 is from the stage which becomes set whenever the fewest number of pulses are counted by sequencer 104. Line 106 will go up or have a pulse output for each C pulse in the input signal train, see FIG. 10C. Output line 107 in from the stage which becomes set only when an intermediate number of pulses is counted by sequencer 104. The signal on line 107 represents the occurrence of an S pulse or wider in the input signal train, see FIG. 10D. Output line 108 is from the stage which becomes set only when the largest number of possible pulses are counted by sequencer 104 so that is goes up or carries a pulse only for each of the widest or R pulses in the input signal train, see FIG. 10E.

Feedback line 106 from output line 52 back to a clock enable input of sequencer 104 is included as a protective measure in the event of faulty operation. In the event that for some reason input line 40 should be held in the high signal level condition, feedback line 106 will ensure that sequencer 104 maintains a condition so that signal line 52 is in the high signal level condition. This means that the devices which are controlled by the signal on line 52 will be maintained in their clear or reset condition so that when the trouble at the input signal line is fixed, they will then be in their initial or starting conditions and will be able to respond as the input signal dictates. Without this feature, if the input signal on line 40 were continuously at a high level, clock 100 would continuously pour out pulses which would cause sequencer 104 to repeatedly advance and the various signal levels would appear on output lines 50, 51 and 52 to cause the devices to which they are coupled to respond and activate.

Figure 5:
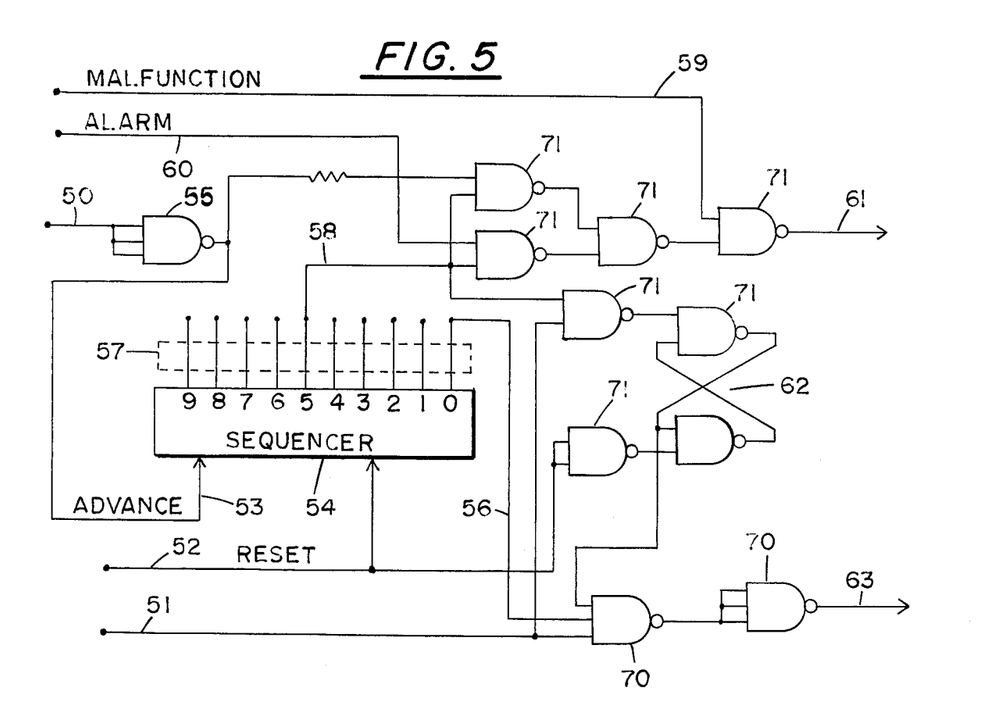
FIG. 5 illustrates a circuit used for responding to and recognizing the calling and polling of a remote station.

Signal line 50 is coupled into the advance input 53 of a counter or sequencer 54 through logical Nand 55. As stated earlier, the only function of the latter is to invert the signal to a proper polarity as needed for this particular design. Sequencer 54 operates in the same manner as sequencer 20 at the central station. Sequencer 54 has 10 stages, stages one through nine respectively corresponding to a different one of the nine stations and stage zero abritrarily designated the starting or synchronizing stage. The output from the starting stage appears on signal line 56 and the output signal lines from stages one through nine of sequencer 54 are referred to collectively by reference numeral 57. At each of the remote stations only one of the nine output lines 57 is selected and wired in and that one is the output signal line corresponding to the number designation arbitrarily given to that particular remote station. For example, remote station designated as station one would have the output signal line from its sequencer 54 wired in from stage one; remote station designated two would have the output of stage two of its sequencer 54 wired in; and similarly, for stations three through nine, mutatis mutandi.

For the purpose of illustrating, the calling mode, assume that station five is being called. Only output signal line 58 coming from stage five of sequencer 54 is then wired into the circuit. The signal on signal line 58 coming from stage five or sequencer 54 is also fed into a combination of logical Nands including a pair of Nands which are cross-coupled to form a flip-flop 62. When the sequencer 54 is set so that stage five is active, the signal on signal line 58 is combined with the S pulse on signal line 51 to set flip-flop 62. The signal state of flip-flop 62 is illustrated in FIG. 7F. As can be observed, upon the concurrence of an S pulse on signal line 51 with a C pulse in time slot 5 (indicating that remote station five is being called) the flip-flop 62 is set to an "up" condition. The simultaneous occurrence of and R pulse on signal line 51 with the flip-flop 62 being in the "up" condition and the sequencer in proper position will produce a short duration pulse output on signal line 63 (FIG. 7G), while at the same time, will drive the flip-flop 62 back to the down condition.

Figure 6:
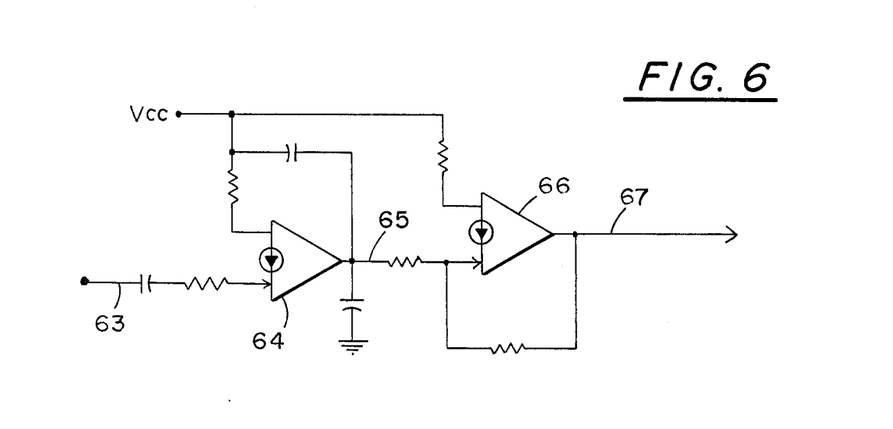
FIG. 6 illustrates a circuit at a remote station for accumulating a series of consecutive signals received at the remote station.

Signal line 63 provides an input to integrator 64 whose function is to accumulate the pulses that appear on signal line 63 and provide a signal output at 65 representative of the accumulated pulse signals. Signal line 65 is coupled to the input of a Schmidt trigger circuit 66 which is constructed and designed in the conventional fashion to provide a signal output on line 65 when the input reaches a pre-set or pre-determined signal level. The design of the circuits and the adjustment of the Schmidt trigger are arbitrarily selected so that a pulse must appear on line 63 from three successive signal trains before a signal output will appear on signal line 65. This means that station five must receive an S pulse in three successive signal trains before it will acknowledge that it has been called. This is to ensure that there has not been an erroneous call due to noise or the like.

Figure 9:
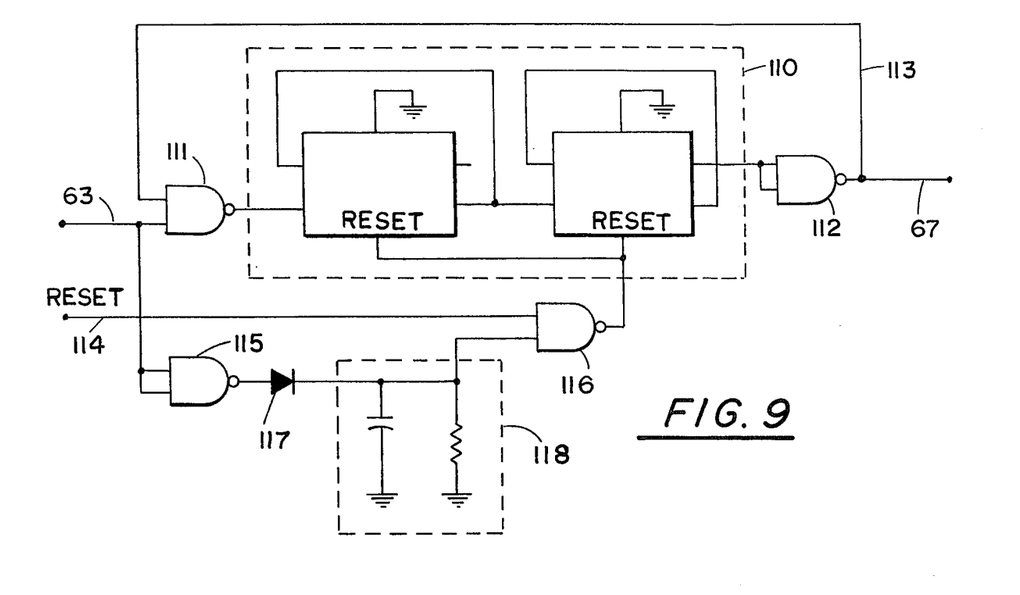
FIG. 9 illustrates an alternative circuit at a remote station for accumulating a series of consecutive received signals.

FIG. 9 illustrates a digital circuit for use with the circuit of FIG. 8 as an alternative to the analog circuit of FIG. 6. The circuit is essentially a two-stage binary counter 110. The signal appearing on signal line 63 (FIG. 7G) is fed through Nand 111 to advance counter 110. For each pulse or high level on input line 63, the counter advances and only when the counter has advanced so that the second stage produces a signal output through Nand 112 at at signal line 67, does an output device such as an alarm bell, respond.

The feedback line 113 from output signal line 67 back to an input of Nand 111, holds the counter 110 in the condition to continually produce a high level output signal on line 67 once it reaches that level to ensure that the alarm device or the like will continue to be energized. Without this, of course, each successive signal on input line 63 would cause counter 110 to step to its next sequential setting. Counter 110 can be cleared by a signal input on reset signal line 114 which usually will be coupled to a manually operable switch.

There is also provided an automatic clearing or reset for counter 110 comprising Nands 115 and 116 with the former having an input from input signal line 63 and its output appearing as an input to Nand 116 through diode 117 and an RC combination 118. In the event no further S pulses or high signal level inputs appear on line 63, the RC combination 118 will cause a decay in the input to Nand 116 which will eventually produce an output from Nand 116 which is applied to the clearing or reset input of counter 110 to clear it to reset it to its initial state. The reset or clearing input to counter 110 has priority and will overcome the effect of the feedback line 113.

Although the use of the digital circuits of FIGS. 8 and 9 as compared to the analog circuits of FIGS. 4 and 6 is merely a matter of choice. There are some advantages in using the former. In the case of the circuit of FIG. 8, for example, the control pulses (FIGS. 10C, D and E) produced at each of the receiving stages are all of uniform precision widths which makes them somewhat easier to apply and use in certain applications. It has also been found that digital circuits are less susceptible to noise interference. In the case of circuit of FIG. 9, the counter arrangement provides a means for separately and independently clearing or re-setting which, in some cases, might be advantageous.

The polling mode of operation is an extension of the calling system and is used to obtain status information. This mode may be used concurrently with the calling mode if desired. The polling mode does not depend on the transmission of intermediate duration pulses as does the calling mode.

When a remote station sequencer advances to a preset stage, a pulse of predetermined duration is transmitted back to the central polling station. The duration of the response pulse defines the status of the remote station. In addition, the absence of a response pulse can be used to convey information such as a system malfunction.

The electronics to generate response pulses and their appropriate duration is arbitrary. The important point is that the position in time of the pulse is controlled by a sequencer which is advanced by the aforementioned calling technique. Thus, the calling system puts the receiver stations in synchronization for polling applications. In this way, a plurality of remote stations transmit status response pulses on a common time shared channel. These same receivers can, if desired, be called without upsetting the polling process.

In a typical polling mode of operation, the signal on line 58 is combined with the signal state of a malfunction signal line 59 and an alarm signal line 60 in a plurality of logical Nands to produce a signal indication on output signal line 61 of the status of the conditions at remote station five. FIGS. 7H and 7I illustrate pulses which might be produced upon polling station five. The pulse widths are arbitrarily selected to give a certain status signal indication but the important factor is that the status signal pulses appear at time slot five of the original transmitted signal train FIG. 7A. The status signals are ordinarily transmitted back to the central station to give an indication of the conditions at the polled remote station. This means that each time the signal state of sequencer 65 is advanced by pulses at advance input 53 to the point where stage five is active, there will appear in that time slot on signal line 61 a signal indication of the states of the conditions being monitored or checked remotely at station five.

It should be pointed out that in the description no effort has been made to make sure that the signals are of the proper polarity or signal level to perform the functions as described. It is perfectly clear to one of ordinary skill in the art that in the event the polarity of the signal is incorrect as described, that all that is necessary is to add or remove a stage of inversion in order to bring the signal to the correct polarity.

Typically, no limitation thereto being intended, sequencers 20 and 54 are commercially available as part No. CD4017AE made by RCA; Nands 24 and 71 are commercially available as part No. CD4011BE made by RCA; Nands 55 and 70 are commercially available as part No. CD4023BE made by RCA; diode 72 is a 1N4001; integrator 41 and comparators 43-45 are commercially available as part No. LM3900 made by National Semiconductor Company; clock oscillator 30 is a commercially available part No. LM555CN made by National Semiconductor Company; and frequency divider stages 31-34 are commercially available as part No. CD4013BE made by RCA. The values for other circuit components, resistors and capacitors, are readily determined by one of ordinary skill depending upon voltage, frequency and power requirements and other factors.

I claim:

1. For electronic communication between a central station which transmits a communication signal train consisting of a series of N + 1 sequential uniform-amplitude square wave pulses, each of said N pulses representing a different remote station and being of short duration for an unselected remote station and being of intermediate duration for a selected remote station and the additional synch pulse being of long duration: means at each remote station for receiving the transmitted signal train and for producing a pulse signal on a first signal line (C pulses) for each received short duration pulse or greater and a pulse signal on a second signal line (R pulses) for each received synch pulse;

sequencer circuit means having N + 1 stages and an output signal line for each stage;

means for feeding said pulses from said first signal line into said sequencer for advancing the signal state of the sequencer from stage to stage in sequence for each received C pulse; and means for combining the signal on the output signal line of a selected one of the sequencer stages with a third signal line to produce signal output upon concurrent appearance of a signal from the selected sequencer stage and on said third signal line.

2. The invention as set forth in claim 1 further including means for feeding R pulses on said second signal line into said sequencer for setting the signal state of the sequencer to a prescribed initial stage.

3. The invention as set forth in claim 2 wherein said receiving means at each remote station further includes means for producing pulse signals on said third signal line (S pulses) for each received intermediate duration pulse or greater, said signal combining means producing an address select signal pulse upon concurrent appearance of an S pulse and a signal from the selected sequencer stage.

4. The invention as set forth in claim 3 further including circuit means coupled to the output of said signal combining means for accumulating address select pulses and for producing an output signal indication only upon occurrence of a predetermined number of said address select pulses in a predetermined time period.

5. The invention as set forth in claim 3 wherein said means for producing pulse signals on said first, second and third signal lines comprises:

integrator circuit means for receiving the signal train and for producing a series of signals representative of the duration of each corresponding received pulse;

three comparator circuits, each set to a different signal comparison level;

a signal line feeding the output from said integrating circuit means to the input of each of said comparator circuits, each of said three comparator circuits producing a signal output on a corresponding signal line only if a signal from the integrating circuit means reaches the signal comparison level of the corresponding comparator circuit.

6. The invention as set forth in claim 3 wherein said means for producing pulse signals on said first, second and third signal lines, comprises:

oscillator circuit means;

means for feeding the signal train to said oscillator;

means for causing said oscillator to produce a small number of output oscillations for each short duration pulse or longer in the signal train, an intermediate number of oscillations for each intermediate duration pulse or longer in the signal train and a greater number of oscillations for each synch pulse in the signal train;

and means coupled to the output of the oscillator for producing a signal indication on a respectively different signal line each time the oscillator produces either a small, an intermediate or a greater number of oscillations.

7. The invention as set forth in claim 6 wherein said latter means comprises counting means for counting the number of oscillations produced by the oscillator for each signal train pulse and for producing a signal indication on a first output signal line each time the oscillator outputs at least said small number of oscillations, a signal indication on a second output signal line each time the oscillator outputs said greater number of oscillations and a signal indication on a third output signal line each time the oscillator outputs said intermediate number of oscillations.

* * * * *